May 13, 1930.  J. F. HARMAN  1,758,743
OIL AND WATER SEPARATOR
Filed April 5, 1929
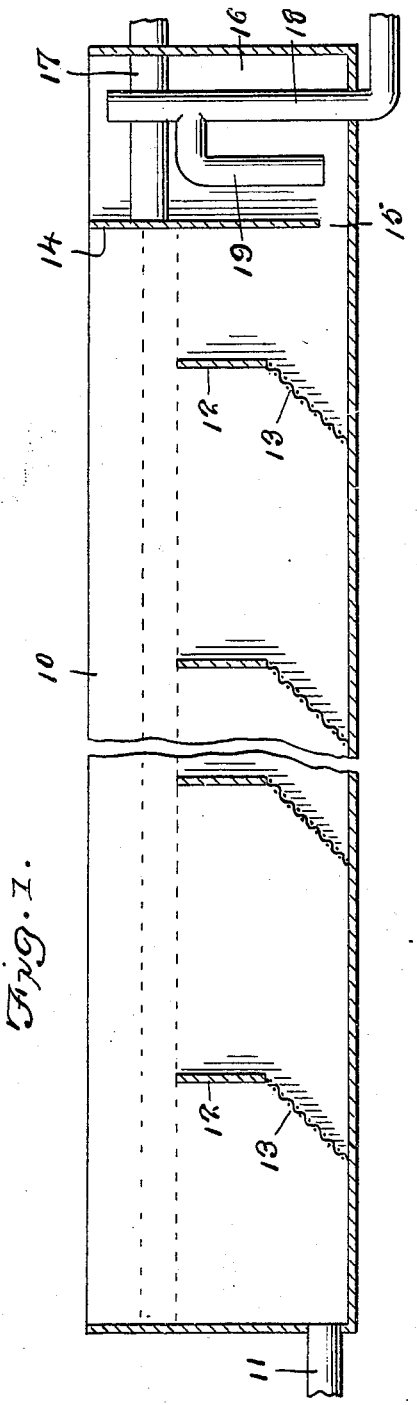
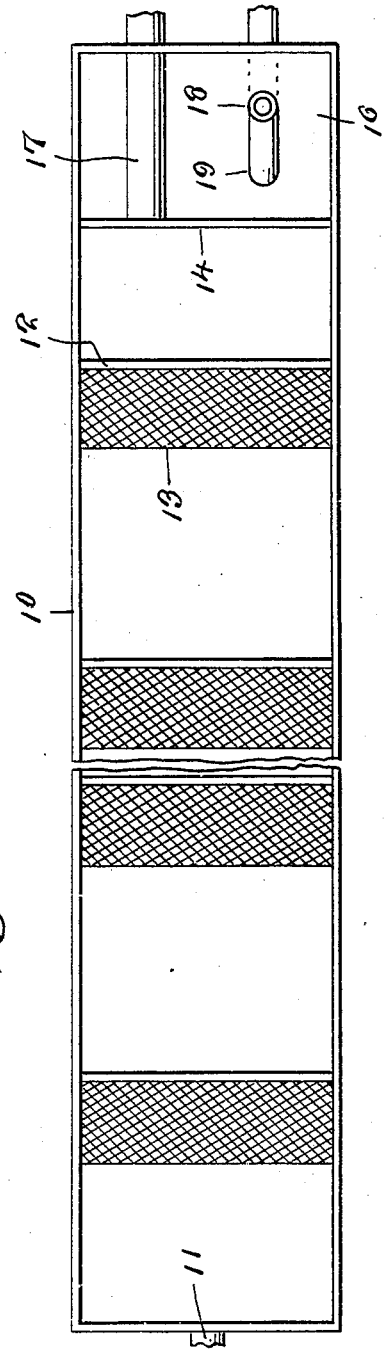
J. F. Harman  INVENTOR
BY Victor J. Evans
ATTORNEY Patented May 13, 1930

1,758,743

UNITED STATES PATENT OFFICE

JAY FLOYD HARMAN, OF RENO, NEVADA

OIL AND WATER SEPARATOR

Application filed April 5, 1929. Serial No. 352,808.

This invention relates to new and useful improvements in separators.

An object of the invention comprehends the provision of a receptacle having discharge ports located at different levels.

Another object of the invention contemplates baffles arranged within the receptacle in advance of the discharge ports to separate the contents of the receptacle into separate levels.

An additional object of the invention consists of a chamber for one of the discharge ports.

More specifically stated the chamber enclosed discharge port is a deviated one whereby the heavier contents of the receptacle will pass therethrough unpolluted by the lighter contents.

A major object of the invention embodies an air inlet for the chamber enclosed discharge port above the level of the heavier contents of the receptacle to relieve suction therein and to insure discharge of the contents as same rises above a predetermined level.

With the above and other objects in view, the invention further consists of the following novel features and details of construction, to be hereinafter more fully described, illustrated in the accompanying drawing and pointed out in the appended claims.

In the drawing:—

Figure 1 is a fragmentary longitudinal sectional view taken through the invention.

Figure 2 is a fragmentary top plan view of the invention.

Referring to the drawing in detail wherein like characters of reference denote corresponding parts, the reference character 10 indicates generally an elongated receptacle having an inlet pipe 11 upon one end wall thereof adjacent its bottom.

As a foreword to the description of the present invention stated in the following, I desire to state that my improved separator is primarily designed for use in the separation of water and oil as same gushes from a well and does not require the usual settling, for prescribed periods, as in other forms of separators. In other words, the mixture of raw petroleum, consisting of oil and water and inert matter, may pass through the receptacle and may be separated as fast, and as long as the receptacle is kept filled to a predetermined height.

Baffle plates 12, horizontally disposed between the side walls of the receptacle at spaced intervals therein longitudinally of the receptacle and projected for appreciable distances upwardly and downwardly of the longitudinal axis of the receptacle are connected at their lowermost depending edges thereof with screen portions or sieves 13 having connection at their opposite ends with the adjacent side of the receptacle bottom. As substantiated from the illustration of my invention, the sieves or screens 13 are arranged at decided inclinations or angles, the purpose of which will be presently apparent.

A partition wall 14, carried within the receptacle adjacent the discharge end wall thereof, is spaced at its lowermost edge from the adjacent portion of the receptacle bottom to provide a passageway 15 therebetween and to create a chamber, such as indicated at 16.

An oil discharge pipe 17, horizontally disposed between and having connection with the partition wall 14 and the adjacent end wall of the receptacle, and longitudinally disposed with relation to the receptacle per se, is situated at an appropriate level preferably higher than the uppermost projecting edges of the baffle plates 12. A water discharge pipe, generally designated, as at 18, upstanding within the chamber 16 and projected through the bottom wall of the receptacle, has its uppermost end extended for appreciable distances beyond the oil discharge pipe 17 to facilitate the admission of air for purposes better understood in the further description of the invention.

An inlet pipe 19, for the water discharge pipe 18, is of substantially L-shaped formation and has the shorter leg thereof connected with an appropriate portion of the discharge pipe 17. The longer depending leg of the inlet pipe 19, is also spaced from the adjacent portion of the receptacle bottom but which extends slightly below the lowermost edge of the partition wall 14.

The oil in the solution, being inherently lighter than the water, will float upon the surface of the water above the uppermost edges of the baffle plates 12, whereby all substances passing through the discharge pipe 17, will possess oily propensities or characteristics. Such level should never be permitted to rise above that of the line established between the upper edges of the baffle plates 12 whereby the water content of the gusher mixture will not pass through the oil discharge pipe 17.

After the mixture passes through the receptacle and contacts with each of the screens or sieves 13 and the baffle plates 12, the oil will be gradually worked to the top as the oil is lighter than water. After the oil and water has reached the discharge end of the receptacle, the water will flow through the passageway 15 below the lowermost depending edge of the partition wall 14, and upwardly within the inlet pipe 19 as the level of the water within the receptacle is maintained at a predetermined level. By reason of the fact that the shorter leg of the substantially inverted L-shaped inlet pipe 19 is disposed below the aforementioned level or line of demarcation defined between the upper surface of the water and the lower surface of the oil, and due to the provision of the upwardly extending open end of the water discharge pipe 18, suction will be relieved within the compartment 16 and the water will pass downwardly and through the water discharge pipe 18 without incurring any deviation of the natural tendency of the oil content from passing upwardly to mix with the oil collecting above the baffle plates 12.

The screens or sieves 13, among other uses, permit the passage of water therethrough but the oil travelling at such level will form bubbles thereon subsequently shifted upwardly incident to the inclination of the screens.

The invention is susceptible of various changes in its form, proportions and minor details of construction, and the right is herein reserved to make such changes as properly fall within the scope of the appended claims.

Having thus described the invention, what is claimed is:—

1. An oil and water separator comprising a receptacle, baffle plates carried thereby, screens mounted within the receptacle having connection with the bottom thereof and the adjacent portions of the baffle plates to facilitate the passage of the water content therethrough, said receptacle having a discharge chamber within one end, an oil discharge pipe horizontally disposed within the chamber and establishing communication at its ends between the interior of the receptacle above the baffle plates and exteriorly thereof, and a water discharge pipe wholly disposed within the chamber having the exit end thereof projecting through the bottom wall of the receptacle.

2. An oil and water separator comprising a receptacle, baffle plates carried thereby, screens mounted within the receptacle having connection with the bottom thereof and the adjacent portions of the baffle plates to facilitate the passage of the water content therethrough, said receptacle having a discharge chamber within one end, an oil discharge pipe horizontally disposed within the chamber and establishing communication at its ends between the interior of the receptacle above the baffle plates and exteriorly thereof, a water discharge pipe wholly disposed within the chamber having the exit end thereof projecting through the bottom wall of the receptacle, and a portion of the water discharge pipe being open and extended for appreciable distances beyond the oil discharge pipe to relieve suction.

3. An oil and water separator comprising a receptacle, baffle plates carried by and arranged at spaced intervals in the length of said receptacle, screens establishing connection between the baffle plates and the bottom of the receptacle being disposed at inclinations therebetween, a partition wall arranged adjacent one end of the receptacle to provide a compartment having the lowermost depending edge thereof spaced from the adjacent portion of the receptacle bottom to provide a passageway therebetween in communication with the compartment, an oil discharge pipe horizontally disposed between the partition wall and adjacent end wall of the receptacle above the baffle plates, a water discharge pipe upstanding within the compartment passing through the bottom wall of the receptacle and having its uppermost open end extended for an appreciable distance beyond the oil discharge pipe to relieve suction, and an inlet pipe for the water discharge pipe having connection therewith below the oil discharge pipe.

4. An oil and water separator comprising a receptacle, baffle plates carried by and arranged at spaced intervals in the length of said receptacle, screens establishing connection between the baffle plates and the bottom of the receptacle being disposed at inclinations therebetween, a partition wall arranged adjacent one end of the receptacle to provide a compartment having the lowermost depending edge thereof spaced from the adjacent portion of the receptacle bottom to provide a passageway therebetween in communication with the compartment, an oil discharge pipe horizontally disposed between the partition wall and adjacent end wall of the receptacle above the baffle plates, a water discharge pipe upstanding within the compartment passing through the bottom wall of the receptacle and having its uppermost open end extended for an appreciable distance beyond the oil discharge pipe to relieve suction, and a substantially inverted inlet pipe for the water discharge pipe having the shorter leg connected therewith below the oil discharge pipe and its opposite end arranged adjacent the passageway.

In testimony whereof I affix my signature.

JAY FLOYD HARMAN.